United States Patent [19]

Dallmer

[11] Patent Number: 5,779,034
[45] Date of Patent: Jul. 14, 1998

[54] DEVICE FOR STORING INFORMATION MATERIAL

[75] Inventor: Johannes Dallmer, Arnsberg, Germany

[73] Assignee: Dallmer GmbH & Co., Arnsberg, Germany

[21] Appl. No.: 730,202

[22] Filed: Oct. 15, 1996

[30] Foreign Application Priority Data

Oct. 18, 1995 [DE] Germany ............ 295 16 486 U

[51] Int. Cl.⁶ .................................. B65D 85/57
[52] U.S. Cl. ............... 206/232; 206/308.1; 206/472; 220/506
[58] Field of Search ............... 206/232, 308.1, 206/308.3, 309–313, 387.13, 472, 474, 490, 216; 220/506

[56] References Cited

U.S. PATENT DOCUMENTS

| 223,162 | 12/1879 | Nuubson | 220/506 |
|---|---|---|---|
| 3,243,037 | 3/1966 | Luertzing | 206/232 |
| 4,518,275 | 5/1985 | Rauch, III et al. | |
| 4,584,848 | 4/1986 | Barnett | 220/506 |
| 4,837,590 | 6/1989 | Sprague | 206/232 |
| 4,986,415 | 1/1991 | Posso | 206/308.3 |
| 5,190,127 | 3/1993 | Cummings | |
| 5,361,898 | 11/1994 | Gottlieb | 206/232 |
| 5,513,746 | 5/1996 | Anderson | 206/232 |
| 5,655,656 | 8/1997 | Gottlieb | 206/232 |

FOREIGN PATENT DOCUMENTS 4133465  10/1991  Germany.

*Primary Examiner*—Paul T. Sewell
*Assistant Examiner*—Luan K. Bui
*Attorney, Agent, or Firm*—Collard & Roe, P.C.

[57] ABSTRACT

The present invention relates to a device for storing information material, said device being characterized in that it consists of a larger container suitable for receiving printed papers and the like, and a smaller container (18) solidly joined with the larger container and suitable for receiving CD's. In this connection, the small container (18) has an access possibility for sliding in or removing CD's, such possibility being given independently of the access possibility to the larger container. The larger container preferably has a bottom part and a cover part (13), which is connected with the bottom part rotating around an axle, so that the cover part (13) can be folded open for inserting or removing printed material.

9 Claims, 2 Drawing Sheets

DEVICE FOR STORING INFORMATION MATERIAL

BACKGROUND OF THE INVENTION

1. Field of the Invention

The present invention relates to a device for storing information material.

2. The Prior Art

Such devices are frequently needed, for example by companies or salesmen in order to supply or make available to their customers information material. Such information may be, for example company information or product information in the form of ring binders, catalogues or the like, which may still have to be completed or rounded with the help of compact discs (CD's). In the meantime, making available such printed material together with electronic information such as, for example in the form of CD's, is more and more common practice. Normally, presentation folders are used for this purpose, which offer space for the printed material and also for a CD.

Said known storage possibilities, however, have the drawback that the printed papers are stored together with the CD in an unarranged way, so that quick finding of the desired information and mainly of a CD is made more difficult. Furthermore, unintended misplacement or loss of the CD is promoted because no separate or fixed space is made available to the latter with the known and usual storage possibilities.

SUMMARY OF THE INVENTION

Therefore, the invention is based on the problem of developing a device for storing catalogues or the like and CD's that permits a quick and safe finding of both paper information and CD's.

According to the invention, said problem is solved in that the device consists of a larger container for receiving printed papers, and a smaller container for receiving CD's, the latter container being joined with the larger one in a fixed way, whereby the smaller container is accessible independently of the accessibility of the larger container, and vice versa.

The smaller container for receiving CD's is usefully mounted in the interior of the larger container, and it is accessible from the outside. In this way, any stacking, if required, or placement of such devices one on top of the other, for example on a shelf, is made possible in a space-saving and safe way, and the CD can be quickly removed, when needed, also without opening the entire device.

The larger container for receiving the printed material, which preferably consists of a bottom part and a cover part, which can be folded open, can be easily opened by folding open the cover part, and thus makes the stored printed material readily accessible.

The cover part usefully has two side walls which, when the device is in the closed condition, grip from the outside across the longitudinal side walls of the bottom part, so that the side walls of the cover part and the longitudinal side walls of the bottom part can easily receive a rotary axle required for folding the cover part open. So that the cover part rests in a better way on the bottom part, both parts preferably have slanted support surfaces.

The smaller container is usefully joined with the bottom of the larger container in a fixed way, so that printed papers stored in the large container are supported by the small container and brought in a raised position, which facilitates quick gripping of stored printed papers.

Furthermore, the smaller container is usefully mounted slanted relative to the bottom of the larger container; in this way, the space available in the larger container is maximally exploited especially when ring binders are stored, and a defined support is made available to stored printed papers. In addition, due to such slanted position of the container, unintended slipping out of the CD is made more difficult.

Advantageously, the smaller container has guide strips which, on the one hand, assure that a CD can be pushed in without problems, and, on the other hand, prevent a CD from falling out into the interior of the larger container.

The geometry of the smaller container is usefully designed in such a way that a fully inserted CD still protrudes slightly from the larger container and thus can be easily taken out. In this connection, the face-side opening of the smaller container opens into the frontal transverse side wall of the larger container, namely in about the center of the latter. This permits gripping of the protruding end of the CD on all sides. Overall, this makes it possible to easily pull out the CD on the face side, with the face side forwardly when the device is stored on a shelf or in a cabinet, also without removing the device from its place.

Furthermore, it is advantageous if the frontal transverse side wall of the larger container and with it the smaller container is displaced toward the rear transverse side wall of the larger container to an extent such that all face-side front edges are aligned and a CD pushed into the smaller container as far as possible will not project beyond such alignment. In this way, the projecting end of the CD can not interfere and the device could be fully put up against a wall with the face side, if need be.

The cover part can be made as one piece from plastic. This applies likewise to the bottom part together with the smaller container. This means that it can be manufactured by the injection molding process, which makes it possible to minimize the assembly cost of the device. But even if this manufacturing technology is not available, both the coverpart, the bottom part and the smaller container may alternatively consist of individual parts (rectangles or elements) that can be manufactured in a simple way, and which can be assembled by known assembly or joining methods.

For reasons of saving weight, aluminum can be used as material for the device or its individual parts as well.

BRIEF DESCRIPTION OF THE DRAWINGS

The present invention is described in the following in greater detail on an exemplified embodiment by reference to the attached drawings, in which.

DETAILED DESCRIPTION OF THE PREFERRED EMBODIMENT

Figure 1:
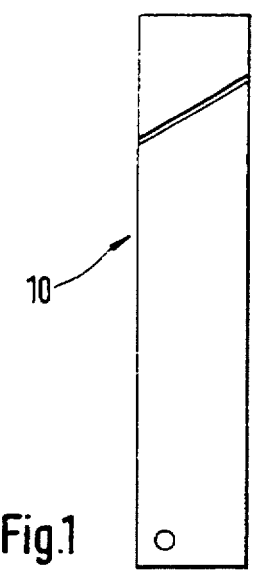
FIG. 1 shows a lateral view of the device according to the invention for storing catalogues and compact discs in a closed condition.
Figure 2:
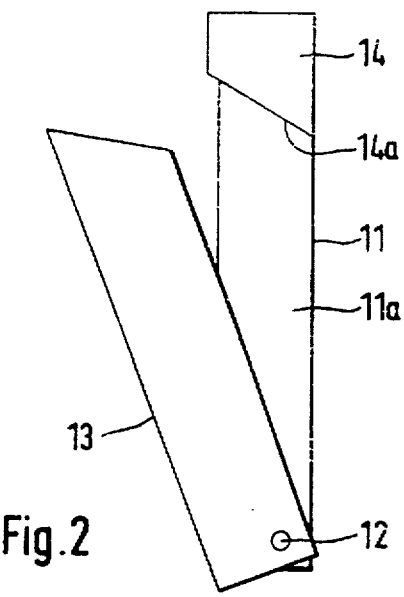
FIG. 2 shows a lateral view of the device in the slightly opened condition.
Figure 3:
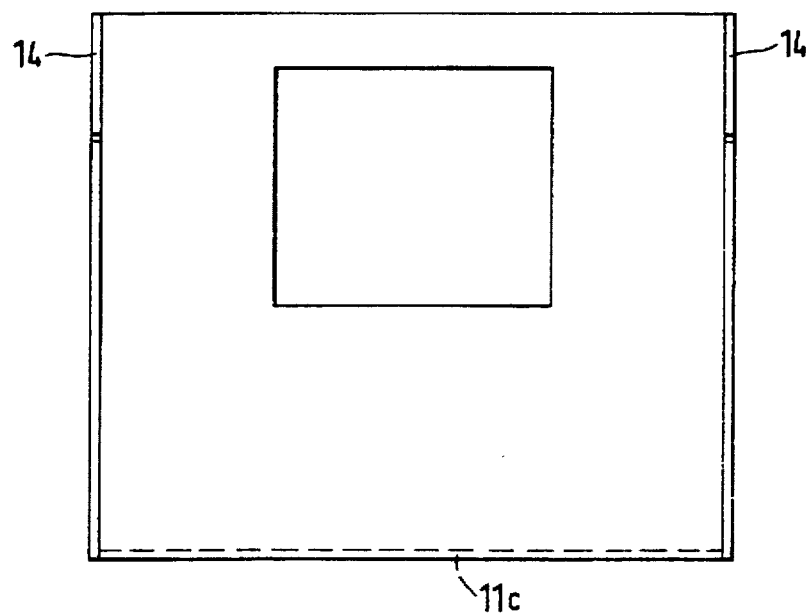
FIG. 3 shows a corresponding bottom view of the device according to FIG. 1.

The device according to the invention for storing catalogues or the like and CD's is denoted as a whole by 10. It comprises a box-shaped, approximately rectangular bottom part 11, which is open to one side, and a cover part 13, which can be folded open and which is connected articulated with said bottom part via a rotary axle 12. The bottom part 11 has the two longitudinal side walls 11a, a frontal transverse side wall 11b, a rear transverse side wall 11c, and a bottom 17, within the zone of the frontal transverse side wall, the parallel side parts 14 with the support surfaces 14a shaped slanted on said parts are laterally formed on the longitudinal side walls 11a, which support surfaces, in the closed condition, serve as abutments for the correspondingly shaped, slanted surfaces 13b of the side walls 13a of the cover part 13. The cover part 13 has a cover 16 with a rectangular plan view. The side walls 13a extend from said cover perpendicularly in the direction of the bottom part 11, said side walls having, as stated before, the slanted surfaces 13b at one end, and the back wall strip 13c of the cover part 13. Apart from the slanted surfaces, the cover part 13 is approximately box-shaped as well, whereby the side walls 13a, when the cover part is closed, cover the longitudinal side walls 11a of the bottom part 11 from the outside and are disposed parallel with said longitudinal side walls.

Figure 5:
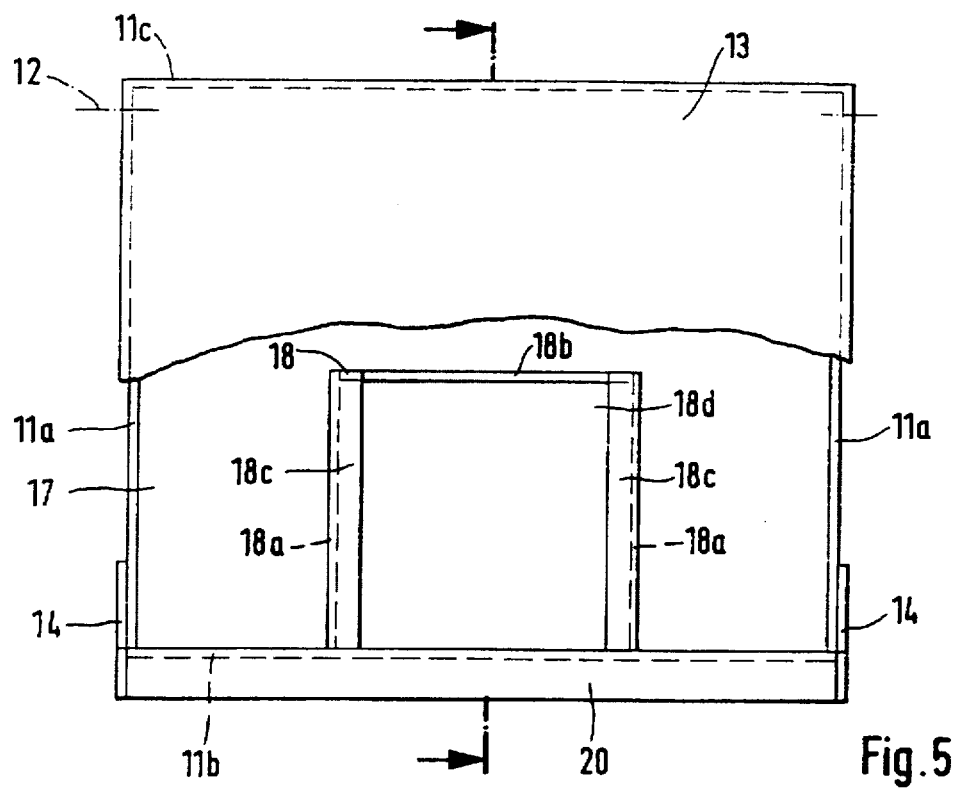
FIG. 5 shows a top view of the device according to FIG. 1; however, with a break-out and visible container for the CD.

FIG. 5 shows that a container 18 extends from the bottom 17 of the bottom part in the direction of the cover part, said container serving for the storage of CD's. Said container 18 has the two longitudinal side walls 18a, a back wall 18b extending transversely to said side walls, said back wall being disposed approximately in the center between the front transverse side wall 11b and the back transverse side wall 11c of the bottom part 11, and being barely half as long as one of the transverse side walls 11b or 11c. Furthermore, the top guide strips 18a, which are to prevent an inserted CD from falling out of the container 18 into the interior of the larger container, extend from the two longitudinal side walls 18a, angled at right angles inwardly. The spacing of the back wall 18b of the container 18 from the front transverse side wall 11b of the bottom part is preferably dimensioned in such a way that a CD completely pushed into the container 18 still protrudes slightly from the opening 19 of the front transverse side wall 11b, so that it can be easily gripped with the hand to be pulled out.

Figure 6:
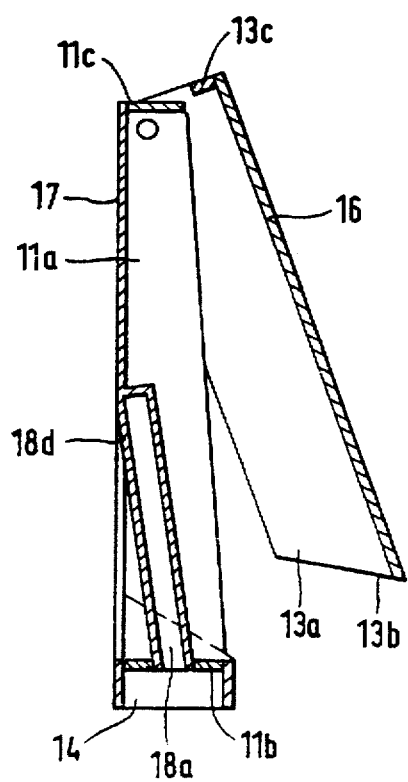
FIG. 6 shows a lateral sectional view of the device in the opened condition, according to the section line in FIG. 5.

FIG. 6 shows that the container 18, with respect to the bottom 17 of the bottom part, is arranged not parallel but slanted, in a way such that at its end facing the rotary axle 12, it borders against the bottom 17 of the bottom part, i.e., where the back wall 18b of the container 18 is disposed, whereas at its other end, which is open toward the outside, it extends slanted away from the bottom 17 of the bottom part, opening into the slot-like, rectangular opening 19 of the front transverse side wall 11b of the bottom part 11, so that it is accessible from the outside.

Figure 4:
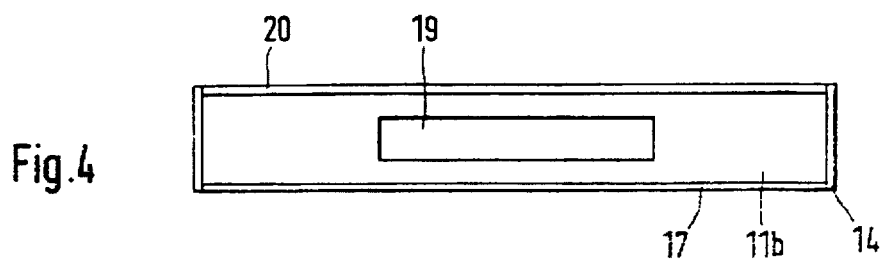
FIG. 4 shows a corresponding face/front view of the device according to FIG. 1.

FIG. 6 shows, furthermore, that the front transverse side wall 11b, in which the opening 19 is present, is slightly recessed versus the bottom 17 of the bottom part, so that viewed from the face side according to FIG. 4, a rectangular frame is obtained, which is formed by the side parts 14, the bottom 17 of the bottom part, and the transverse strip 20, said frame extending around all sides. The consequence of this is that when the CD is completely pushed in, it protrudes slightly from the opening 19, however, not beyond the alignment of the frame. The box-shaped bottom part 11 with its two longitudinal side walls 11a, the front transverse side wall 11b, the back transverse side wall 11c, and the bottom 17 forms a second container with a rectangular outline, which serves for receiving a catalogue, a ring binder or the like. Owing to the slanted arrangement of the container 18, which is visible in FIG. 6, the space for printed material placed in the bottom part 11 is maximized. Furthermore, it is possible in this way to place a catalogue or ring binder in the bottom part 11 in such a way that a thicker end, in particular if it is a ring binder, comes to rest on the side of the bottom part facing the axle 12, whereas the thinner end of the ring binder faces the front transverse side wall 11b of the bottom part. If the bottom part 11 is to receive a catalogue having a constant thickness across its length, this is possible without problems as well, whereby the thickness of the catalogue may maximally conform to the spacing still available, such spacing being formed between the guide strips 18c bordering on the front transverse side wall 11b and the closed cover 16.

Handling of the device according to the invention is very simple. Pushing in or removal of the compact disc can take place at any time when the device stands or lies on the shelf and the opening 19 for the compact disc is accessible from the ace side of the device. For inserting or removing a ring binder or catalogue, however, the device is taken from the shelf, placed with the bottom 17 of the bottom part on a support, the cover part 13 is lifted by swinging it like a hinge around the rotary axle 12, and the catalogue or the ring binder is placed in or removed from the opened receptacle of the bottom part 11.

What is claimed is:

1. A device for storing information material, comprising:
   a larger container for receiving printed papers, said larger container having a bottom; and
   a smaller container for holding standard size CDs fixedly joined to said larger container, said smaller container being disposed within said larger container and accessible from the outside, and having a bottom arranged slanted with respect to the bottom of said larger container;
   wherein said larger container and said smaller container are independently accessible.

2. Device according to claim 1, characterized in that the larger container consists of a bottom part (11) and a cover part (13) rotatably connected with the bottom part via a rotary axle (13), and that said larger container has an approximately rectangular form in the outline, wherein the bottom of the smaller container has an end facing the rotary axle that borders on the bottom of the larger container.

3. Device according to claim 1, characterized in that the cover part (13) consists of a cover (16) and two side walls (13a) with slanted support surfaces (13b), whereby the side walls (13a) cover the longitudinal side walls (11a) of the bottom part (11) from the outside and receive with said walls the rotary axle (12).

4. Device according to claim 1, characterized in that the bottom part (11) consists of two longitudinal side walls (11a), a front transverse side wall (11b), a back transverse side wall (11c), a transverse strip (20), two side parts (14) provided with slanted support surfaces (14a), and a bottom (17).

5. Device according to claim 1, characterized in that the smaller container (18) with an approximately rectangular outline is mounted fixed on the inside on the bottom (17) of the bottom part (11).

6. Device according to claim 1, characterized in that the smaller container (18) has two longitudinal side walls (18a), and that from said walls, two top guide strips (18c) extend parallel with the bottom (18d) of the smaller container at right angles angled inwardly.

7. Device according to claim 1, characterized in that the depth of the smaller container (18) is smaller than the diameter of a standard size CD.

8. Device according to claim 1, characterized in that the smaller container has an opening in the form of a slot disposed approximately in the center of the front transverse side wall (11b) of the bottom part.

9. Device according to claim 1, characterized in that the front transverse side wall (11b) of the bottom part is recessed versus the bottom (17) of the bottom part toward the back transverse side wall (11c) of the bottom part to an extent such that the edges present on the face side of the device are aligned and a standard size CD pushed into the container (18) as far as possible does not protrude beyond said alignment.

* * * * *